United States Patent [19]

Williams

[11] Patent Number: 4,472,274
[45] Date of Patent: Sep. 18, 1984

[54] DEBRIS SEPARATOR FOR DOWNSPOUTS

[76] Inventor: Robert M. Williams, 10071 Atherton Rd., Davison, Mich. 48423

[21] Appl. No.: 477,499

[22] Filed: Mar. 21, 1983

[51] Int. Cl.³ .............................................. B01D 35/02
[52] U.S. Cl. .................................... 210/163; 210/447; 210/459
[58] Field of Search ............... 210/162, 163, 164, 422, 210/446, 456, 483, 498, 447, 459

[56] References Cited

U.S. PATENT DOCUMENTS

| | | | |
|---|---|---|---|
| 224,699 | 2/1880 | June | 210/318 |
| 520,993 | 6/1894 | Keller | 210/162 |
| 783,740 | 2/1905 | Barker | 210/163 |
| 899,568 | 9/1908 | Shepard | 210/163 |
| 939,838 | 11/1909 | Hensler | 210/162 |
| 1,177,174 | 3/1916 | Doty | 210/130 |
| 2,090,997 | 8/1937 | French | 210/433.1 |
| 2,419,501 | 4/1947 | Pinto | 210/316 |
| 2,494,780 | 1/1950 | Schmidt | 210/357 |
| 3,628,668 | 12/1971 | Huppert | 210/446 |
| 4,345,998 | 8/1982 | Graffis et al. | 210/164 |

Primary Examiner—Richard V. Fisher
Assistant Examiner—W. Gary Jones
Attorney, Agent, or Firm—Gifford, VanOphem, Sheridan, Sprinkle & Nabozny

[57] ABSTRACT

A debris separator for rain gutter systems includes a substantially tubular housing having an upper port, a lower port, and an expanded chamber beneath the top port having a transverse opening. An inclined grate is secured within the chamber to extend angularly upwardly from the bottom peripheral edge of the transverse opening so as to extend across the chamber and the top port. Preferably, the grid includes a plurality of spaced, parallel plates which permit water to fall therebetween while diverting large particulate along the grid to direct it out of the housing through the transverse opening.

9 Claims, 9 Drawing Figures

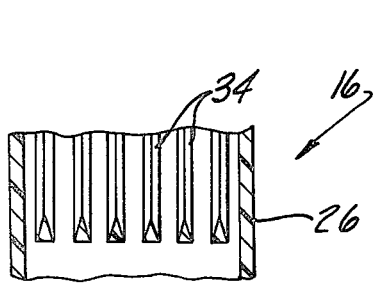
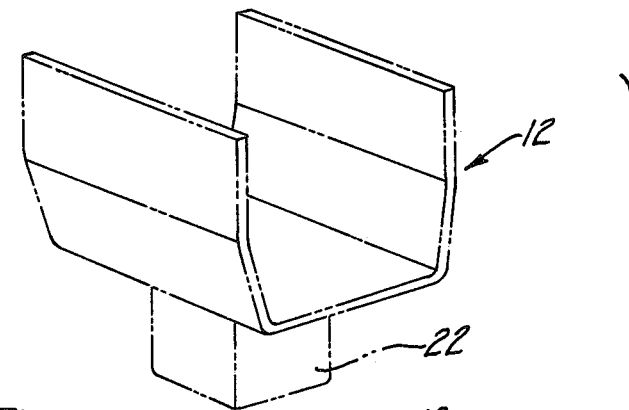
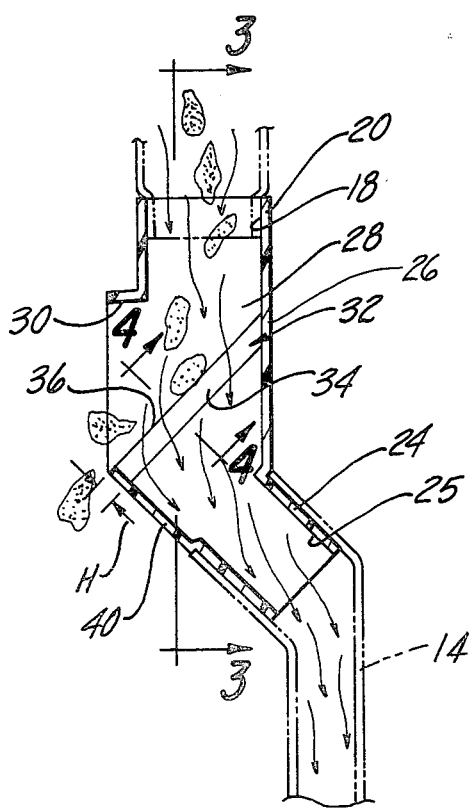
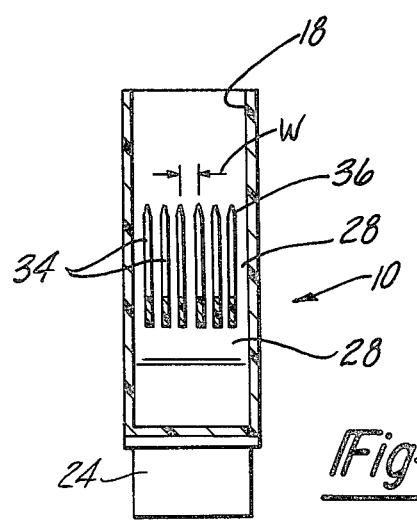

DEBRIS SEPARATOR FOR DOWNSPOUTS

BACKGROUND OF THE INVENTION

I. Field of the Present Invention

The present invention relates generally to gutter systems for buildings, and more particularly, to a device intended for use with rain gutters having means for separating solid debris such as leaves from the flow of water through the downspout of the gutter system.

II. Description of the Prior Art

Gutters are well known, open-topped channel devices attached to building constructions adjacent the roof edge to collect rain water deposited on the roof and direct it away from the structure of the building through a downspout. It is also well known that the open-topped gutters are exposed to loose debris and that water introduced into the gutters and directed through the downspouts often contains leaves, sticks and other debris which has accumulated on the roof and is washed into the gutter. Such debris often accumulates in and thus clogs the downspouts and prevents the gutter system from directing the fluid away from the building. Oftentimes clogging of the gutter system causes water to spill over the edges of the gutters and along the walls of the building, thereby damaging or defacing the building structure.

In order to prevent the accumulation and clogging of debris within the downspouts of the gutter system, it has been known to position a screen over the top of the gutter or the downspout opening so that the leaves and other debris cannot enter into the downspout. However, covering the top opening of the gutter or downspout with a screen causes the debris to accumulate on top of the screen and, thus, interferes with the flow of water into the downspout unless the debris collected on the screen is removed at frequent intervals.

A previously known device which continuously separates debris from the water flowing into the downspout is disclosed in U.S. Pat. No. 2,090,997 to French. French discloses a rectangular casing having circular aligned openings in the top and bottom as well as an opening in one side of the casing. A plurality of curved guides with rounded edges are secured at one end to the side wall below the side opening and extend upwardly to be secured at their other end to the opposite side of the casing so as to extend across the fluid path between the upper and lower openings. Thus, the guides are designed to catch the solid debris and slide it toward the opening by the force of the water running along the flat sides of the curves. In addition, the casing includes a baffle depending downwardly beneath a portion of the top opening so that water falling through the opening is deflected toward the guides and forces the water as well as the debris against the guides.

While the French patent teaches that it is intended that the water will pass through the guides and continue out through the lower opening, while the debris slides out through the side opening, the shape of the guides as well as the deflector panel contribute to the flow of water along the guides as well as splashing of water. Therefore, the guides divert the water away from the lower opening, whereby a portion of the water splashes or flows out through the side opening. Thus, a portion of the rainwater flowing through the casing fails to reach the lower opening into the downspout, being diverted out through the side opening, thus, preventing the downspout from collecting all of the water entering the gutter and decreasing the efficiency of the gutter system to direct water away from the building structure or the ground surface below. Moreover, since the lowermost portion of the curved guides is nearly horizontal, debris may not slide as quickly, and can even accumulate, along the lower portion of the guides and, thus, contributes to splashing and diversion of the water from the downspout. Therefore, the device permits undesirable leakage of water which passes out of the side opening of the separator.

SUMMARY OF THE PRESENT INVENTION

The present invention overcomes the above-mentioned disadvantages by providing a debris separator for downspouts comprising a tubular housing having a top opening which is in unobstructed fluid communication with an enlarged chamber below the opening. The enlarged chamber is laterally expanded in at least one direction and the side wall of the expanded housing portion includes a transverse opening. A grate extends across the upper opening and the chamber and is inclined upwardly from the lower edge of the transverse opening. The tubular housing also defines an exhaust opening below the enlarged chamber beneath the grate.

The grate comprises a plurality of spaced apart, narrow, parallel plates having a straight top edge. Preferably, at least the top edge of each plate is tapered to minimize the surface area contacted by water flowing through the upper opening. However, the height of each plate prevents debris such as twigs from becoming entwined in the grate and forces them to roll or slide along the top of the plates and out of the transverse opening. Moreover, the plates are inclined at a steep angle so that gravity forces the debris quickly along the top edges of the plates toward the transverse opening.

In one preferred embodiment of the invention the grate is removable so that it can be replaced when broken or damaged or by a grate with a smaller or greater spacing where the particular circumstances require it.

The tubular housing of the debris separator preferably includes upper and lower tubular wall portions defining the periphery of the upper and lower openings respectively so that the separator can be secured in a conventional manner to the rain gutters and downspout conduits conventionally used. For this reason, it is preferable that the end portions of the tubular housing walls of the upper and lower portion of the housing be symmetrical. In addition, the lower housing portion is preferably inclined downwardly and inwardly away from the transverse opening so that debris falling out through the transverse opening falls freely out of the debris separator without accumulating therein. Thus, the lower housing portion includes an inclined wall portion angled downwardly from the lower edge of the transverse opening. The inclined wall portion also prevents water from splashing outwardly from the debris separator and, thus, further serves to collect the water introduced through the top opening and direct substantially all of it to the downspout for removal to a predetermined drain.

Thus, unlike previously known debris separators, water flowing into the top opening of the debris separator from the rain gutter does not contact any flat facing surfaces which can cause splashing or divert the water to flow toward the transverse opening along the guides and out the transverse opening. Nevertheless, the inclination of the narrow, spaced plates, together with the force of the flowing water forces solid debris such as leaves, twigs and the like out of the rain gutter system through the transverse opening in a manner which does not permit the debris to accumulate in or on the separator housing. Moreover, the present invention more efficiently separates the debris from the rainwater, and more efficiently collects and directs the water into the downspout than previously known debris separators.

Also by providing a removable grate, it is possible to replace a damaged grate by snapping a new one in its place.

BRIEF DESCRIPTION OF THE DRAWING

The present invention will be more clearly understood by reference to the following detailed description of a preferred embodiment, when read in conjunction with the accompanying drawings in which like reference characters refer to like parts throughout the views and in which:

FIG. 1 is an exploded perspective view of a debris separator in accordance with the present invention assembled in the rain gutter system;

FIG. 2 is a cross-sectional elevation of the debris separator shown in FIG. 1;

FIG. 3 is a sectional view taken substantially along line 3—3 in FIG. 2;

FIG. 4 is a fragmentary, enlarged cross-sectional view taken substantially along line 4—4 in FIG. 2 and showing a modification thereof;

DETAILED DESCRIPTION OF A PREFERRED EMBODIMENT OF THE PRESENT INVENTION

Figure 5:
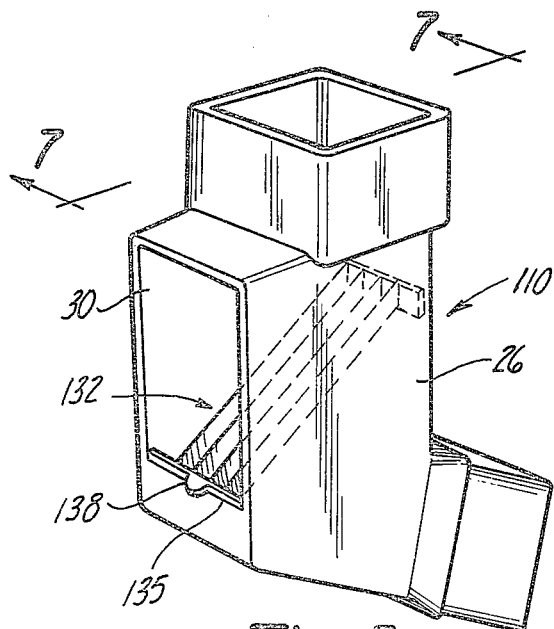
FIG. 5 is a perspective view of a preferred modification of the debris separator of the present invention.
Figure 6:
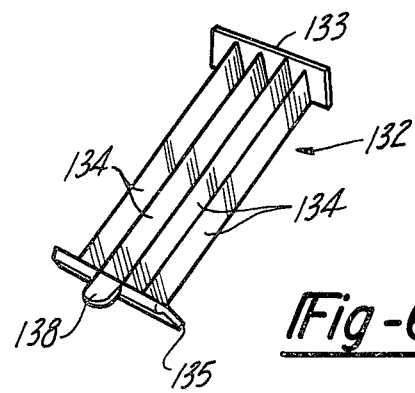
FIG. 6 is a perspective view of the grate shown in the debris separator in FIG. 5.

Referring first to FIG. 1, a debris separator 10 is shown positioned between a rain gutter 12 and a downspout 14. The debris separator 10 comprises a substantially tubular housing 16 having a top opening 18 defined by a tubular upper wall portion 20 adapted to receive a depending tubular drain 22 of rain gutter 12. A lower housing portion 24 has an opening 25 (FIG. 2) adapted to be received in the upper end of the downspout 14. The lower housing portion 24 preferably extends at an angle with respect to the axis of tubular wall portion 20 as can best be seen in FIG. 2.

While in the preferred embodiment, the debris separator 10, the rain gutter 12 and the downspout 14 are made of a plastic material, it will be understood that it is within the scope of the present invention to construct these components from other materials as well.

Moreover, while the tubular housing portion 16 is substantially rectangular, and the upper housing portion 20 and lower housing portion 24 have a symmetrical, square cross section which enable them to mate with depending gutter portion 22 and the upper end of the downspout 14, respectively, the shape of these housing portions can be modified to mate with differently configured gutter flanges and downspouts. In addition, adaptors can also be inserted into the upper housing portion 20 and over the lower housing portion 24 to permit the debris separator 10 to be used with cylindrical conduit members of the type typically used in aluminum rain gutter systems.

Referring to FIGS. 1 and 2, the substantially tubular housing 16 includes a central portion 26 forming a chamber 28 beneath the opening 18. The chamber 28 is at least as large as the opening 18 so that effluent passing through the opening 18 flows without obstruction directly into the chamber 28. In addition, as best shown in FIG. 2, the central housing portion 26, and thus the chamber 28 is larger than the opening 18 in at least one direction, i.e. to the left as shown in FIG. 2, and includes a transverse opening 30 in the side of the expanded portion.

A grate 32 is mounted in the chamber 28 so as to extend across the chamber 28 and across, but beneath, the opening 18. The grate 32 is inclined upwardly from the lower peripheral edge of the transverse opening 30 toward the back wall of the central housing portion 26. As best shown in FIG. 3, the grate 32 comprises a plurality of elongated plates 34 preferably having sharpened upper edges 36, and the rise of the plates preferably exceeds the run so that the slope is more nearly vertical than horizontal.

The sharpened top edges 36 of the plates 34 minimize the surface area which can divert the effluent flowing through the port 18 into the chamber 28. In addition, the narrow width of the sharpened edge 36 minimizes frictional resistance between the debris engaged by the plates 34 of the grate 32 and thus, increases the speed with which the leaves and other debris are separated from the effluent and removed from the separator. In addition, the plates 34 are arranged in a spaced, parallel configuration in which each plate 34 can be closely aligned with the adjacent plates.

The height H of each of the plates (See FIG. 2) is longer than the width W of each plate (See FIG. 3) so that twigs or other debris cannot tumble and become lodged beneath the bottom edge of the plate when the twig is forced into contact with the grate 32 at an angle to the grate 32. Since the top edges 36 provide minimal surface resistance to the flow of liquid effluent, the liquid flows easily through the spaces between the plates 34 and the grate 32. Debris in the effluent, such as leaves, twigs or the like, is engaged by the top edges 36 of the plates 34 and, thus, is prevented from falling through the chamber 28 into the lower housing portion 24. While only the top edge 36 of each plate 34 needs to be sharpened, it will be understood that the plates 34 could be found with a triangular cross section as shown in FIG. 4.

Referring again to FIG. 2, the lower housing portion 24 includes an angled wall portion 40 angled downwardly from the lower peripheral edge of the opening 30. Since the wall 40 extends laterally beyond the peripheral edge of the opening 18 into the expanded portion of the chamber 28, water which passes through the opening 18 is directed by the wall portion 40 into a downspout 14 even though the flow of water may be partly diverted toward the expanded portion of the chamber by the grate 32 or splashes within the chamber 28. The wall portion 40 is inclined downwardly toward the back wall of the housing 16 so that any water splashing against the wall 40 is deflected downwardly into the downspout 14 and will not be deflected out through the transverse opening 30.

FIGS. 5-9 disclose a preferred modification of the present invention with many features common to the embodiment shown in FIGS. 1-4. Where the structural elements are the same, the same reference numerals have been used.

The debris separator 110 of FIGS. 5-9 differs from the debris separator 10 of FIGS. 1-4 in that the grate 132 (FIG. 6) is separable from the central housing portion 26.

Figure 8:
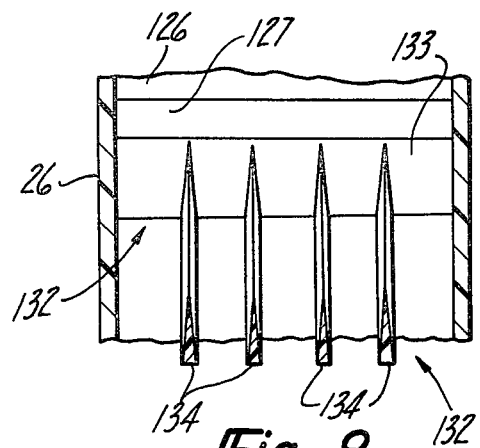
FIG. 8 is a sectional view taken substantially along line 8—8 of FIG. 7.
Figure 7:
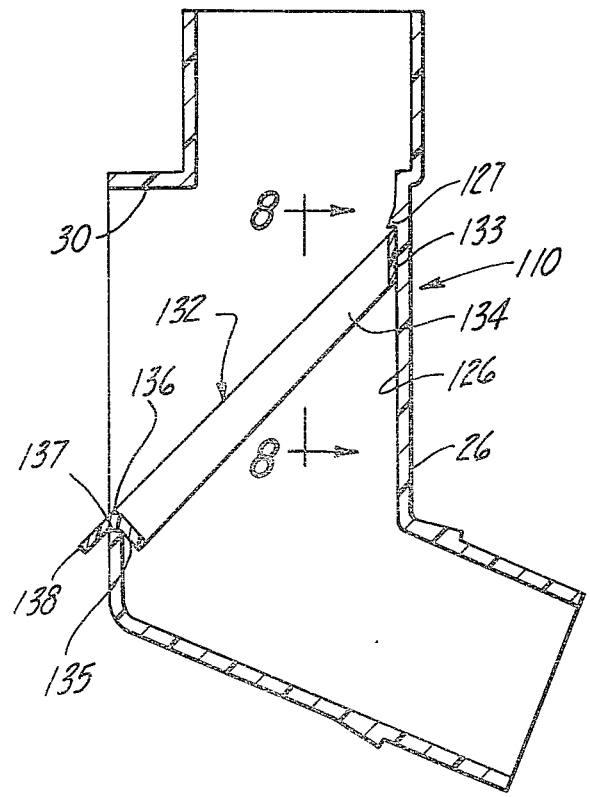
FIG. 7 is a cross-sectional elevation of the debris separator shown in FIG. 5.
Figure 9:
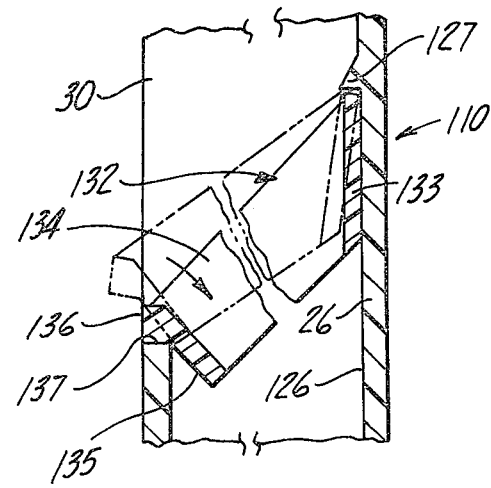
FIG. 9 is a fragmentary broken view of a portion of the structure shown in FIG. 8 illustrating the manner of position of the grate in the debris separator.

As can best be seen in FIGS. 7, 8 and 9, the back wall of 126 of the housing portion 26 is provided with an inwardly formed flange 127 which forms a stop for a rear frame member 133 of the grate 132. Plates 134 extend between the rear frame member 133 and a front frame member 135. As can best be seen in FIG. 9, the front frame member 135 is formed with a leading edge 136 formed to snap over the edge 137 forming the opening 30 to timely lock the grate 132 in place. A tab 138 (FIG. 6) permits ready removal of the grate 132 for replacement. Such replacement could be made if the grate 132 becomes damaged or clogged and also if special circumstances warrant the replacement of the grate 132 with one of a different size or configuration.

Having thus described the important structural features of the preferred embodiments of the present invention, the operation of the device is easily described. The description will refer to the embodiment of FIGS. 1-4, but it should be apparent that it applies as well to the preferred modification shown in FIGS. 5-9. When the upper housing portion 20 of the debris separator 10 is slid over the depending drain spout 22 from the gutter 12, the opening 18 of the debris separator 10 is in fluid communication with the rain gutter 12. In addition, insertion of the lower housing portion 24 into the downspout 14 provides fluid communication between the outlet opening 25 and the interior of the downspout 14. As effluent from the gutter 14 flows through the opening 18 and into the chamber 28, the solid matter contained in the effluent contacts the top edges 36 of the plates 34 and is prevented from passing through the outlet opening 25. Nevertheless, the rainwater passes through the spaces between the plates 34 and into the outlet opening 25. The angle of inclination of the grate 32 enables the solid debris to slide along the top edges 36 of the plates 34 and out of the transverse opening 30. Water flowing through the opening 18 and dropping onto the debris on the grate can supplement the force of gravity on the debris, and forces the debris out of the opening 30. However, although some of the water impinging upon the debris tends to move along with the debris down the grate, the expanded portion of the chamber extending beyond the periphery of the opening 18 enables most of the water impinging against the debris to roll off the debris and against the inclined wall portion 40 before the debris exits through the opening 30. Moreover, although some of the water which contacts the plates 34 in the grate 32 may be slightly diverted to flow along the plates, the inclined wall portion 40 extending into the expanded portion of the chamber collects and diverts toward the opening 25 any water which is caused to flow along the plates 34.

Since the top edge of each of the plates 34 as shown is straight, there are no flattened valleys in the grate which can cause debris to accumulate on top of the grate. It should be apparent, however, that the top edge of the plates 34 do not have to be straight and could, if desired, be concave or convex. In addition, since the top edges 36 of the plates 34 are sharpened by reason of the taper of the top edge, substantially all of the liquid flows undiverted into the outlet opening 25 within the lower housing portion 24. Moreover, the tapered edge provides little surface area to frictionally resist the sliding of debris along the grate 32. However, due to the close spacing of the plates 34 and because of the size of the debris such as leaves, twigs and the like, the debris is prevented from passing between the plates 34 or grid 32. Thus, substantially all of the particulate debris is diverted along the grate 32 away from the outlet opening 25 and is expelled out through the transverse opening 30. It is preferable that the angle of inclination of the grate 32 be more nearly vertical than horizontal so that the force of gravity upon the particulate debris easily forces the debris along the grate 32 and out through the opening 30 in the housing 16. Moreover, the height of the plates 34 prevents the ends of twigs or the like from becoming lodged beneath the plates in a manner which clogs the plates or permits the particulate matter to fall between the plates 34.

Moreover, since the inclined wall portion 40 extending into the expanded portion of the chamber 28 is inclined downwardly toward the back wall of the housing, and thus, extends inwardly from the transverse opening 30, water falling against the wall portion 40 or diverted along the grate 32 is deflected down toward the downspout 14 and cannot be splashed or diverted out through the transverse opening 30. Thus, while the structure of the grate minimizes the amount of splashing occurring within the debris separator, any splashing which does occur within the debris separator is directed away from the transverse opening 30 and towards the downspout 14.

The debris separator 110 shown in FIGS. 5-9 operates substantially the same as the debris separator 10 except that it has the advantage that the grate 132 can be readily removed if it becomes damaged or if special circumstances indicate that a grate 132 with differently spaced or differently dimensioned plates 134 will do a better job. A new grate 132 can be readily snapped into place to replace the old grate 132.

Thus, the present invention provides a debris separator which effectively and efficiently diverts large particulate debris away from the downspout and expels it out of the gutter system. At the same time, substantially all of the water entering the inlet opening 18 exits through the outlet opening 25 even though the flow of some of the water is diverted by contact with the grate or debris which has fallen against the grate. Moreover, any water splashing within the debris separator itself is diverted away from the transverse opening and is directed toward the outlet opening 25 into the downspout 14. In addition, the debris separator is readily adapted for use with the various types of conventional gutter systems.

Having thus described my invention, many modifications thereto will become apparent to those skilled in the art to which it pertains without departing from the scope and spirit of the present invention as defined in the appended claims.

What is claimed is:

1. For use in a gutter system having a downspout, a debris separator comprising:
   a tubular housing having a top opening, a central housing portion defining an expanded chamber beneath said top opening, said chamber being larger than said top opening in at least one lateral direction, said chamber being aligned under said top opening so as to provide unobstructed fluid communication between said opening and said chamber;

a transverse opening in said central portion adjacent said laterally expanded chamber portion, said transverse opening having a bottom peripheral edge, said central housing portion having a flange extending inwardly into said chamber on a side of said central housing portion opposite from said transverse opening, said flange being spaced upwardly from said bottom peripheral edge, a lower housing portion having a housing wall inclined downwardly from said edge of said transverse opening and a grate having a rear frame member, a front frame member and a plurality of plates extending between said frame members, said grate being removably insertable into said chamber through said tranverse opening to an operating position in which said rear frame member abuts against said flange and said front frame member being formed with a leading edge which abuts against said bottom peripheral edge, said leading edge including means to snap over said bottom peripheral edge, said grate being dimensioned so that, upon insertion of said grate to said operating position, said grate is frictionally locked to said housing between said flange and said bottom peripheral edge.

2. The invention as defined in claim 1, wherein said top opening is defined by an elongated, tubular upper housing portion having a symmetrical cross section.

3. The invention as described in claim 1, wherein said plates are spaced and parallel to each other and vertically aligned.

4. The invention as described in claim 3, wherein said plates include a sharpened top edge.

5. The invention as described in claim 3, wherein said plates are triangular in cross section.

6. The invention as described in claim 3, wherein said plates include a straight top edge.

7. The invention as described in claim 1, wherein said housing is made of a plastic material.

8. The invention as described in claim 1, wherein said lower housing portion comprises an elongated tubular end portion having a symmetrical cross-section.

9. The invention as described in claim 1, wherein said inclined wall portion extends inwardly from said peripheral edge.

* * * * *